Jan. 20, 1953 — W. C. KIEFER — 2,626,016
AUTOMATIC LUBRICATOR FOR MOVING CONVEYER
CHAINS AND OTHER MOVING MECHANISMS
Filed June 14, 1951 — 3 Sheets-Sheet 3
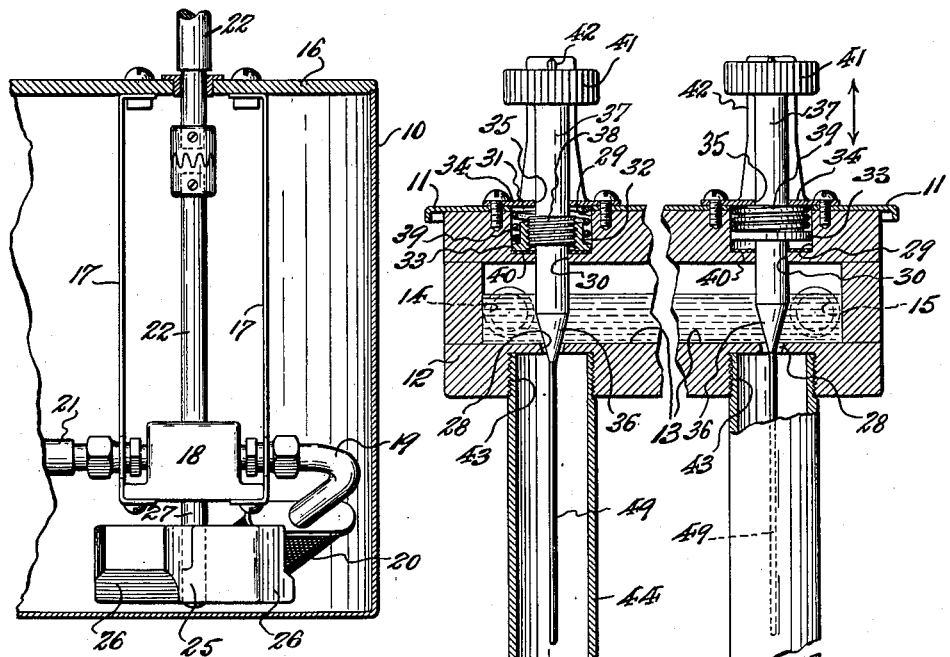
Fig. 4
Fig. 5
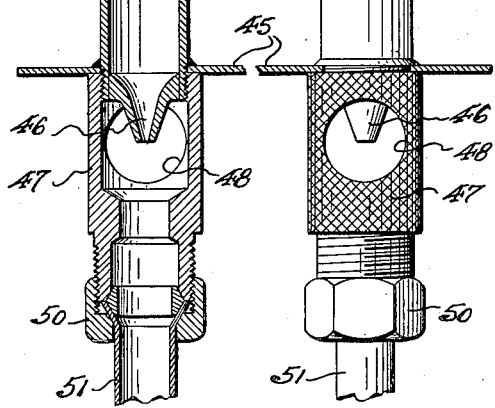
INVENTOR.
William C. Kiefer,
BY George D. Richards,
Attorney Patented Jan. 20, 1953

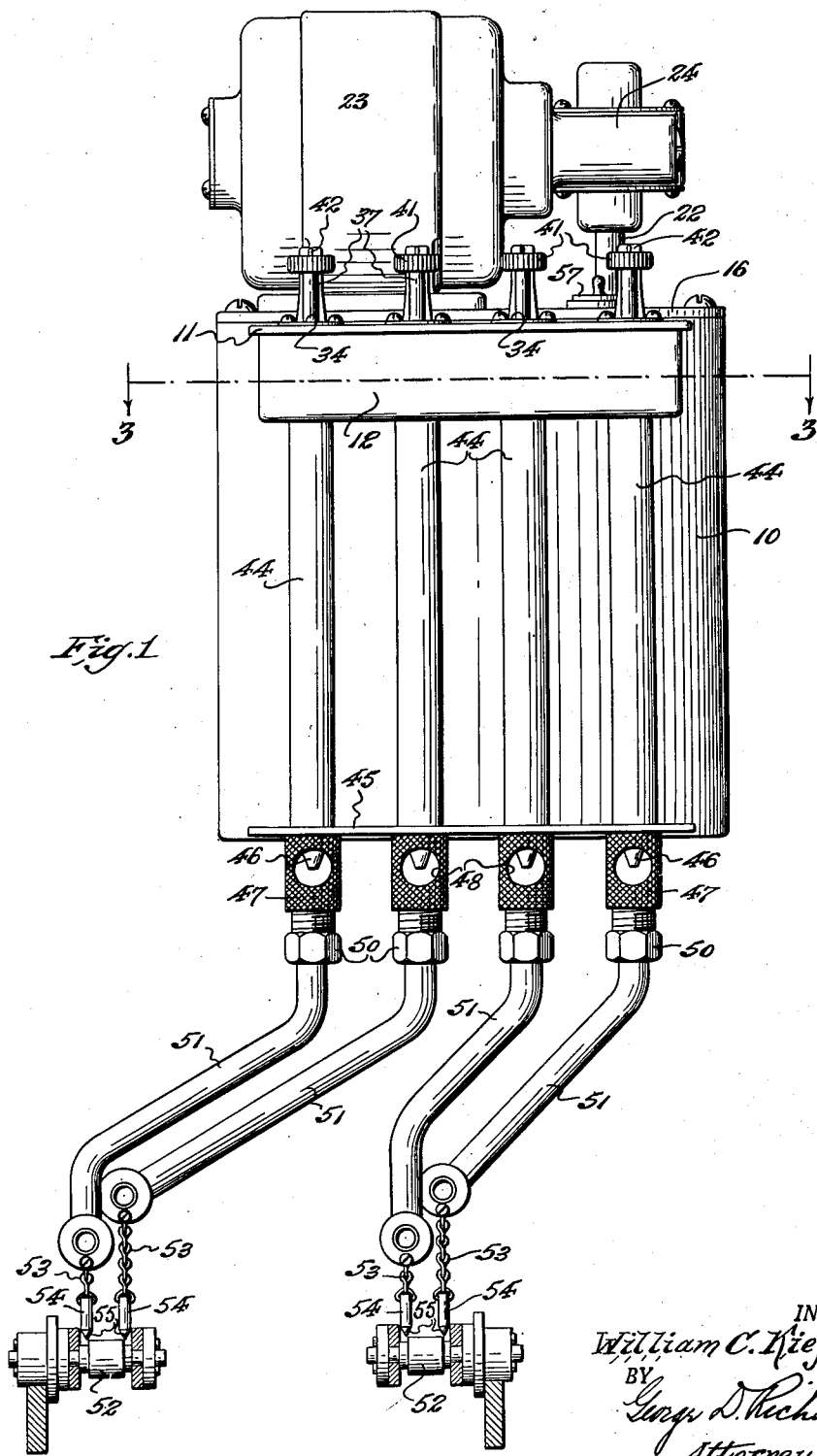

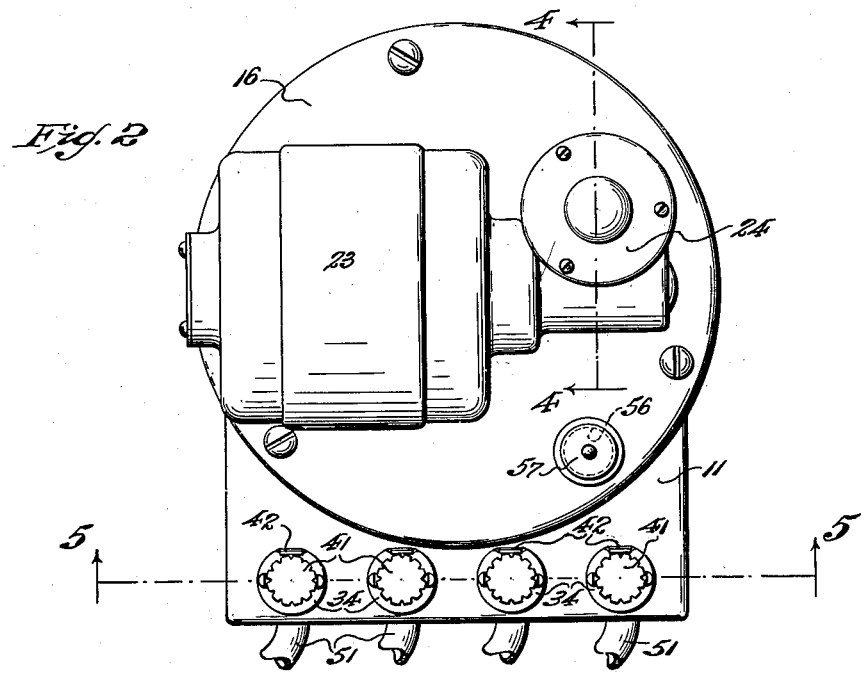
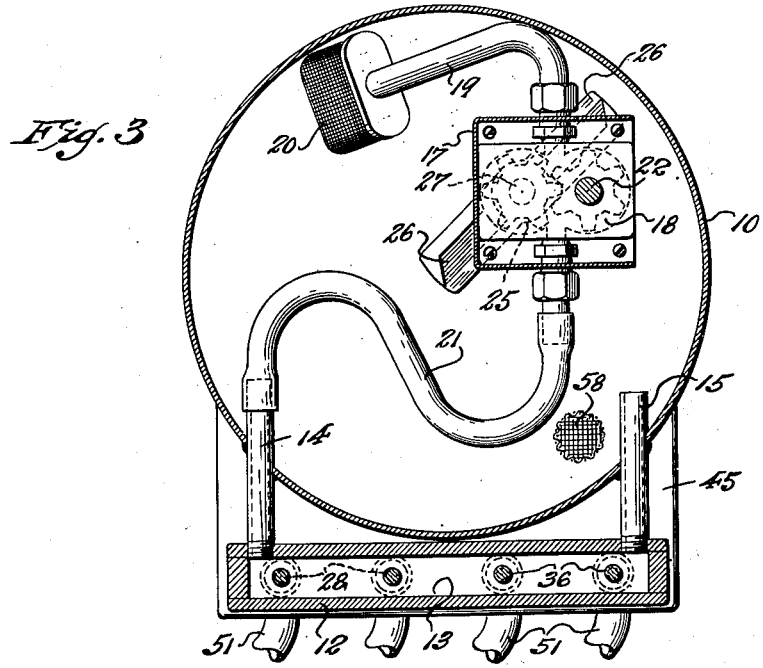

2,626,016

UNITED STATES PATENT OFFICE 2,626,016

AUTOMATIC LUBRICATOR FOR MOVING CONVEYER CHAINS AND OTHER MOVING MECHANISMS

William C. Kiefer, Green Village, N. J., assignor to Bel-Ray Company, Inc., Madison, N. J., a corporation of New Jersey Application June 14, 1951, Serial No. 231,462

7 Claims. (Cl. 184—81)

This invention relates to lubricating devices; and the invention has reference, more particularly, to gravity feed lubricator which is especially adapted to automatically supply, to running chains or other moving mechanisms, a fluid lubricant, or a fluid lubricant mixture such, for example, as flake graphite, molybdenum disulfide or a similar solid suspended in a liquid vehicle such as an oil.

For the lubrication of moving conveyer chains generally, and especially for lubrication of conveyer chains used in connection with baking and other heat treating ovens, it is desirable to use a lubricant mixture of graphite or molybdenum disulfide or the like and oil. It is an object of this invention to provide a lubricator device which is adapted to automatically dispense any suitable kind of fluid lubricant, but which is especially adapted to so dispense a lubricant mixture of the kind above referred to; said lubricator device being operable to feed the lubricant or lubricant mixture by gravity to and for application upon moving conveyer chains or upon moving parts of other types of mechanism requiring lubrication.

The invention has for a further object to provide a lubricator device adapted to automatically dispense the lubricant or lubricant mixture from a supply reservoir, and to discharge the same by gravity in steady flow and uniform quantity to the place of use. To this end, the device according to this invention includes a discharge manifold having one or more discharge outlets, to which manifold the lubricant or lubricant mixture is delivered from the supply reservoir by a power driven pump so as to constantly flow therethrough and thence back to the supply reservoir, thereby maintaining a constant and uniform head of lubricant or lubricant mixture within the manifold above its discharge outlets, so that gravity outflow of the lubricant or lubricant mixture from the discharge outlets is subject to uniform head pressure at all times, whereby the delivery of the lubricant or lubricant mixture to the place of use is maintained constant and uniform in rate of flow and in quantity.

Another object of the invention is to provide the discharge manifold outlet or outlets with adjustable valve means for regulating the volume of lubricant or lubricant mixture discharged therethrough; said valve means being also manipulatable to clear the outlet or outlets against choking, the valve means being operable for the latter purpose without risk of disturbing the selected flow control adjustment thereof.

A further object of the invention is to provide the lubricator device with a conduit means for conducting the dispensed lubricant or lubricant mixture to the conveyer chains or other moving parts to be lubricated.

Other objects of this invention, not at this time more particularly enumerated, will be understood from the following detailed description of the invention.

An illustrative embodiment of this invention is shown in the accompanying drawings, in which:

Fig. 1 is a front side elevational view of a lubricator device according to this invention; Fig. 2 is a top plan view of the same; Fig. 3 is a horizontal sectional view thereof, taken on line 3—3 in Fig. 1; Fig. 4 is a fragmentary vertical longitudinal section, taken on line 4—4 in Fig. 2, parts being shown in elevation; and Fig. 5 is a fragmentary vertical longitudinal section, taken on line 5—5 in Fig. 2, but drawn on an enlarged scale, parts in this view being also shown in elevation.

Similar characters of reference are employed in the above described views, to indicate corresponding parts.

In the following specification, the term "lubricant" as used therein is intended to comprehend any type of liquid lubricant, or any type of flowable lubricant mixture, such, for example, as a suspension of graphite or of molybdenum sulfide in a liquid vehicle such as an oil.

Referring to the drawings, the reference character 10 indicates an upwardly open reservoir member adapted to contain a supply of lubricant. Supported by a horizontal bracket plate 11, which is affixed to the reservoir member 10 to project externally from the latter adjacent the upper end thereof, is a manifold member 12, the interior of which provides a chamber 13 for the reception of lubricant delivered thereinto from the reservoir member. Connected between one end of the manifold member 12 and the reservoir member 10, in communication between the interior of the latter and the chamber 13 of the former, is a lubricant delivery pipe or conduit 14. Similarly, connected between the opposite end of the manifold member 12 and the reservoir member 10, in communication between the chamber 13 of the former and the interior of the latter, is a lubricant return pipe or conduit 15.

The upper open end of the reservoir member 10 is normally closed by a removable cover member 16, which may be secured in place by any suitable fastening means. Dependent from the cover member 16, within the interior of the reservoir member 10, is a hanger frame 17 which is adapted to support a pump 18 operative to circulate lubricant between the interior of the reservoir member 10 and the chamber 13 of the manifold member 12. Connected with the intake side of said pump 18 is an intake conduit 19 which is submerged in the lubricant content of the reservoir member, with its inlet end disposed adjacent to the bottom of said reservoir member. Affixed to the inlet end of said intake conduit 19 is a strainer member 20. Connected with the discharge side of the pump 18 is a discharge conduit 21 which extends to the intake end of the lubricant delivery pipe or conduit 14, to which it is suitably coupled so as to deliver the pumped lubricant into the chamber 13 of the manifold member 12 for flow therethrough, and thence back to the reservoir member interior by way of the return pipe or conduit 15.

The pump 18 is operated by a drive shaft 22 which extends upwardly therefrom through and exteriorly of the cover member 16 of the reservoir member. The pump drive shaft 22 is power driven, and, to this end, an electric motor 23 is mounted on the cover member 16 to serve as a power source. The power of said motor 23 is transmitted to the shaft 22 through a worm and worm gear or other suitable transmission (not shown) which is contained in a housing 24 connected with and supported by the casing of said motor 23.

Located intermediate the pump 18 and the bottom of the reservoir member 10, to revolve in a horizontal plane adjacent to said bottom of the reservoir member, is an agitator member 25 having radial paddle blades 26 of suitable shape. Said agitator member 25 is power driven through the pump, and, to this end, power is transmitted from a rotated element of said pump to a shaft 27 upon which the agitator member 25 is fixed. The movement of the agitator member through the lubricant in which it is submerged operates to stir and keep the latter in motion against thickening and formation of sludge, and when a lubricant mixture comprising a suspension of solids in a liquid vehicle is utilized, the agitating effect of the agitator member 25 maintains the solids in uniform suspension in the liquid vehicle of the mixture, so that precipitation of said solids is prevented, thus assuring maintenance of the lubricant mixture in free flowing condition.

Since the pump 18 and agitator member 25 are supported dependently from the removable cover member 16 of the reservoir member 10, which also carries the motor 23 and transmission mechanism, the whole assembly can be easily and quickly removed from the reservoir member by detaching the cover plate from the latter, and consequently access to the pump and associated parts may be readily attained in the event cleaning or repair thereof is required.

Formed in the bottom wall of the manifold member 12 are one or more outlet ports 28. When a plurality of said outlet ports 28 are provided, the same are suitably spaced apart along the length of the manifold member. Cooperative with each outlet port 28 is an adjustable valve means by which the volume of lubricant outflow under gravity from the chamber 13 of the manifold member through the outlet port can be regulated. Each valve means is so constructed and arranged that it is subject to manipulated reciprocation relative to the outlet port served thereby, whereby, when reciprocated, to permit flushing clearance of the outlet port so as to prevent any tendency to choking thereof by accumulation of lubricant or lubricant ingredients.

Each valve means comprises the following structure. Formed in the top wall of the manifold member 12 is an upwardly open recess 29 disposed in axial alignment with the outlet port 28 to which it is opposed. Extending between the recess 29 and the chamber 13 of the manifold member is a slideway opening 30. The upwardly open end of the recess 29 registers with a corresponding opening 31 in the bracket plate 11. Supported within the recess 29 is an internally screw-threaded bushing 32, which is provided at its bottom end with an external annular flange 33. Secured to the bracket plate 11 and manifold member 12, to close the recess 29, is a cover plate 34 having a slideway opening 35 in axial alignment with the recess and the bottom slideway opening 30. Cooperative with the outlet port 28 is a conical valve member 36, the stem 37 of which extends upwardly through the slideway openings 30 and 35 and through the bushing 32 in the recess 29. Said stem 37 is provided with an externally screw-threaded section 38 which is threaded into the bushing 32. A compression spring 39 is interposed between the cover plate 34 and the flange 33 of the bushing 32, thus yieldably holding said bushing normally seated on the bottom of the recess 29. Preferably, a perforate sealing washer 40 is interposed between the bottom of the bushing 32 and the floor of the recess 29. The upwardly projecting external end of the valve stem 37 is provided with a finger piece or knob 41 having a serrated circumferential side surface which is engageable by a spring detent member 42, whereby to prevent accidental rotation of the valve stem 37 and resultant displacement of the valve member 36 from a desired predetermined adjusted disposition thereof relative to the outlet port 28 served thereby. Preferably said detent member 42 is formed in connection with and as a part of the cover plate 34.

Formed in the underside or bottom wall of the manifold member 12, in alignment with each outlet port 28, is an internally screw-threaded, downwardly open socket 43, into which is threaded a discharge pipe 44. The lower end of the discharge pipe extends through a horizontal bracket plate 45 which is affixed to the reservoir member 10 to project externally therefrom adjacent the lower end thereof. Fixed within the lower end of discharge pipe 44 is a discharge nozzle 46. The lower end portion of discharge pipe 44 is externally screw-threaded for the reception of a sight cage 47. Said sight cage is provided in opposite side walls thereof with sight openings 48 through which flow discharge or drop emission of lubricant from the discharge nozzle 46 may be observed, whereby to facilitate the operation of adjusting the valve member 36 for regulating lubricant discharge through the outlet port 28 in desired volume and rate of flow. If desired, each valve member 36 may include, in downward axial extension therefrom into the interior of discharge pipe 44, a lubricant guide stem 49.

Connected, by suitable union means 50, to and for extension from each sight cage 47 is a conduit 51, which is adapted to be led to a running conveyer chain 52 as shown, or to other moving mechanism required to be lubricated. The free discharge end of conduit 51 is suitably spaced above the point of the chain or other mechanism to which lubricant is desired to be applied. Connected with the discharge end of conduit 51, to depend therefrom, is a lubricant flow guide means 53, which preferably comprises a length of flexible chain or the like. Attached to the free end of the flow guide means 53 is an applicator finger 54 having a pointed extremity 55 which is directed toward and so as to drop the lubricant upon the parts of the conveyer chain 52, or other mechanism, to which the lubricant is to be served. The applicator device may be provided in any other suitable form, as, for example, in the form of a pendant brush.

The cover member 16 of reservoir member 10 is provided with a filling opening 56, normally closed by a removable stopper 57. If desired a strainer member 58 may be arranged to depend from the filling opening 56.

In operation, the reservoir member 10 having been filled with lubricant, the motor 23 is started so as to operate the pump 18, and at the same time to revolve the agitator member 25 whereby to keep the lubricant in the reservoir in motion, which is especially desirable if the lubricant comprises a suspension of solids in a liquid vehicle in order to prevent precipitation of the solids.

The driven pump 18 operates to constantly deliver a stream of lubricant from the reservoir member into the chamber 13 of the manifold member 12, so that the lubricant continuously flows through the latter to return thence back to the reservoir member by way of the return pipe 15. By thus continuously circulating lubricant through the manifold member chamber 13, the lubricant within the latter is maintained at a predetermined uniform depth therein, and consequently a uniform head pressure is constantly effective at the outlet ports 28. Due to this, the outflow of lubricant from the manifold member under gravity and through the distributing discharge devices to the place of use is maintained at a constant uniform rate, subject only to volume control by the adjusted valve means which cooperate with the outlet ports 28. As a consequence an even, non-fluctuating flow of lubricant to the place of use is assured, so that neither excessive nor diminished delivery of lubricant to the place of use can occur. The application of lubricant to the mechanism to be lubricated is therefore attained without waste and in a highly efficient and economical manner.

Should the lubricator device stand idle, as during a period of non-use, there might be tendency of the lubricant to collect in and possible choke the outlet ports 28. Under such circumstances, the outlet ports can be easily flushed out and cleared by lifting and, if desired, reciprocating the valve member 36. In such manipulation of a valve means, its stem 37 is pulled upwardly carrying therewith its bushing 32, to the upward movement of which the spring 39 yields, so that the valve member 36 is withdrawn from the outlet port 28 served thereby (see the right hand valve means shown in Fig. 5). The resultant wide opening of the outlet port 28 allows lubricant to discharge freely therethrough with flushing and cleansing effect. Such manipulation of the valve means can be carried out without disturbing the adjusted setting of the valve member 36, since, when the valve stem 37 is released, the spring 39 will return the bushing 32 to its normal seated position within the recess 29.

It will be obvious that by rotation of a valve stem 37, its threaded section 38 can be raised or lowered relative to the bushing 32, thus spacing the valve member 36 relative to the outlet port 28 so as to increase or decrease, as the case may be, the effective area of the latter.

I am aware that changes could be made in the forms and arrangements of parts shown in the drawings and above described, and consequently it is intended that the disclosure of said drawings and description shall be interpreted as illustrative and not in a limiting sense, except as may be required by the scope of the hereollowing claims.

I claim:

1. A lubricator comprising a reservoir member to contain a supply of lubricant, a manifold member supported in connection with the reservoir member, a pump, means for driving the pump, the intake side of the pump being supplied with lubricant from the reservoir member content, lubricant delivery conduit means connected between the discharge side of the pump and the manifold member, a lubricant return conduit leading from the manifold member back to the interior of the reservoir member, whereby lubricant is continuously circulated through the manifold member so as to establish a constant uniform head thereof within the latter, said manifold member having at least one outlet port in its bottom wall for discharging lubricant by gravity therefrom, a conical valve member cooperative with said outlet port, said valve member having a valve stem extending upwardly through and outwardly from the top wall of the manifold member, the top wall of the manifold member having an upwardly open recess concentric to the valve stem, an internally screw-threaded bushing seated in said recess, said valve stem having a screw-threaded section in engagement with said bushing and cooperative with the latter upon rotation of the valve stem to adjust the valve member toward and from the outlet port, means to close said recess, a compression spring to yieldably seat said bushing in the recess subject to axial movement therein when the valve stem with the valve member is axially reciprocated, detent means for holding said valve stem and valve member against accidental rotative displacement from a desired adjusted position, and a distributing conduit means for delivering lubricant discharged from the outlet port to a place of use.

2. A lubricator according to claim 1 including a revolvable agitator member within the reservoir member adapted to be driven by the pump driving means.

3. A lubricator according to claim 1 wherein the distributing conduit means includes a sight cage through which passage of distributed lubricant can be observed.

4. A lubricator comprising a reservoir member to contain a supply of lubricant, a cover for said reservoir member, a pump, means for suspending the pump from the cover within the interior of the reservoir member, a shaft for driving the pump, said shaft extending upwardly through and exteriorly of the cover, an electric motor mounted on the cover, means for transmitting the power of the motor to the pump drive shaft, a manifold member supported in connection with the reservoir member, the intake side of the pump being supplied with lubricant from the reservoir member content, lubricant delivery conduit means connected between the discharge side of the pump and the manifold member, a lubricant return conduit leading from the manifold member back to the interior of the reservoir member, whereby lubricant is continuously circulated through the manifold member so as to establish a constant uniform head thereof within the latter, said manifold member having a plurality of outlet ports in its bottom wall for discharging lubricant by gravity therefrom, a valve means for each outlet port, each valve means comprising a conical valve member cooperative with an outlet port to be served thereby, said valve member having a valve stem extending upwardly through and outwardly from the top wall of the manifold member, the top wall of the manifold member having an upwardly open recess concentric to the valve stem, an internally screw-threaded bushing seated in said recess, said valve stem having a screw-threaded section in engagement with said bushing and cooperative with the latter upon rotation of the valve stem to adjust the valve member toward and from said outlet port, means to close said recess, a compression spring to yieldably seat said bushing in the recess subject to axial movement therein when the valve stem with the valve member is axially reciprocated, detent means for holding said valve stem and valve member against accidental rotative displacement from a desired adjusted position, and a distributing conduit means cooperative with each outlet port for delivering lubricant discharged from the latter to a place of use.

5. A lubricator according to claim 4 including a revolvable agitator member within the reservoir member, and means for driving said agitator member from and simultaneously with the pump.

6. A lubricator according to claim 4 wherein each distributing conduit means includes a sight cage through which passage of lubricant moving therethrough can be observed.

7. In a lubricator, a lubricant dispensing manifold member to which the lubricant is delivered from a source of supply for discharge from said manifold member to a place of use, said manifold member having at least one outlet port in its bottom wall for discharging lubricant by gravity therefrom, a conical valve member cooperative with said outlet port, said valve member having a valve stem extending upwardly and outwardly from the top wall of the manifold member, the top wall of the manifold member having an upwardly open recess concentric to the valve stem, an internally screw-threaded bushing seated in said recess, said valve stem having a screw-threaded section in engagement with said bushing and cooperative with the latter upon rotation of the valve stem to adjust the valve member toward and from the outlet port, means to close said recess, a compression spring to yieldably seat said bushing in the recess subject to axial movement therein when the valve stem with the valve member is axially reciprocated, detent means for holding said valve stem and valve member against accidental rotative displacement from a desired adjusted position, and a distributing conduit means for delivering lubricant discharged from the outlet port to a place of use.

WILLIAM C. KIEFER.

REFERENCES CITED

The following references are of record in the file of this patent:

UNITED STATES PATENTS

| Number | Name | Date |
|---|---|---|
| 1,885,500 | Williamson | Nov. 1, 1932 |
| 2,274,473 | Davis | Feb. 24, 1942 |
| 2,543,638 | Mercier | Feb. 27, 1951 |